United States Patent
Perotto (10) Patent No.: US 10,442,500 B2
(45) Date of Patent: Oct. 15, 2019

(54) CONTROL SYSTEM FOR A WATERCRAFT'S LIFTING SURFACES

(71) Applicant: Elia Perotto, Pisa (IT)

(72) Inventor: Elia Perotto, Pisa (IT)

(*) Notice: Subject to any disclaimer, the term of this patent is extended or adjusted under 35 U.S.C. 154(b) by 0 days.

(21) Appl. No.: 15/983,217

(22) PCT Filed: Nov. 23, 2016

(86) PCT No.: PCT/IB2016/057061
§ 371 (c)(1),
(2) Date: May 18, 2018

(87) PCT Pub. No.: WO2017/089969
PCT Pub. Date: Jun. 1, 2017

(65) Prior Publication Data
US 2018/0327051 A1  Nov. 15, 2018

(30) Foreign Application Priority Data
Nov. 24, 2015 (IT) .......................... 102015000076015

(51) Int. Cl.
*B63B 1/28* (2006.01)
*G01P 5/165* (2006.01)

(52) U.S. Cl.
CPC .............. *B63B 1/286* (2013.01); *G01P 5/165* (2013.01)

(58) Field of Classification Search
CPC ... G01P 5/16; G01P 5/165; G01P 5/17; B63B 1/286
See application file for complete search history.

(56) References Cited

U.S. PATENT DOCUMENTS

| 2,709,979 A | * | 6/1955 | Bush | ..................... B63B 1/285 114/277 |
| 3,103,197 A | * | 9/1963 | Von Schertel | .......... B63B 1/286 114/277 |

(Continued)

FOREIGN PATENT DOCUMENTS

FR  2 587 967 A1  4/1987

OTHER PUBLICATIONS

International Search Report, dated Apr. 26, 2017, corresponding to PCT/IB2016/057061.

*Primary Examiner* — Andrew Polay
(74) *Attorney, Agent, or Firm* — Ladas & Parry LLP; Malcolm J. MacDonald (57) ABSTRACT

A watercraft structure (100) comprises a hull (110) and a lifting surface (120) connected to the hull (110) and immersed at least partially in water, said lifting surface (120) adapted to generate a lift force suitable for supporting the hull (110), said lifting surface (120) comprising a movable portion (125) arranged to rotate relatively to the watercraft (100), between a position of higher lift and a position of lower lift. The watercraft structure (100) also comprises an actuating mechanism (130) arranged to actuate the movable portion (125) between the above described positions. The actuating mechanism (130) comprises a containing volume comprising a first chamber (141) at a pressure $P_a$ and a second chamber (142) at a pressure $P_b$ divided by a septum (145), said septum (145) having a first face (145a) having surface $S_a$ and oriented towards the first chamber (141) and a second face (145b) having surface $S_b$ and oriented towards the second chamber (142). The actuating mechanism (130) also comprises a reference channel (152) hydraulically connected to the second chamber (142), said reference channel (152) being in communication with the external environment by a reference opening (152') that, in use, is constantly (Continued)

below the level of the water and is oriented in the motion direction. The actuating mechanism (130) comprises then a compensation channel (151) hydraulically connected to the first chamber (141), said compensation channel (151) being in communication with the external environment by at least one respective compensation opening (151') located at a greater height respect to the reference opening (152'), said or each compensation opening (151') being oriented in the motion direction.

8 Claims, 7 Drawing Sheets

(56) References Cited

U.S. PATENT DOCUMENTS

| | | | | |
|---|---|---|---|---|
| 3,146,457 | A | * | 8/1964 | Von Schertel .......... B63B 1/286 114/277 |
| 3,364,892 | A | * | 1/1968 | Persson .................. B63B 1/286 114/277 |
| 3,645,223 | A | | 2/1972 | Whitener |
| 3,929,084 | A | | 12/1975 | Cline |
| 3,994,253 | A | | 11/1976 | Mathewson |
| 4,577,579 | A | | 3/1986 | Williams |
| 5,004,439 | A | * | 4/1991 | Onoue ...................... G01P 5/14 440/2 |
| 6,481,363 | B1 | | 11/2002 | Liu |
| 2003/0070602 | A1 | | 4/2003 | Burg |

\* cited by examiner

Fig. 6

CONTROL SYSTEM FOR A WATERCRAFT'S LIFTING SURFACES

FIELD OF THE INVENTION

The present invention relates to the field of watercrafts provided with of lifting surfaces located under the hull, such as the hydrofoils.

In particular, the invention relates to a system for handling and controlling the lifting surfaces.

DESCRIPTION OF THE PRIOR ART

As well known, the hydrofoils exploit the lift of surfaces immersed in water for reducing the percentage of hull immersed subject to hydrodynamic resistance.

For this reason it is essential to be able to adjust the height of the hull on the water level increasing or decreasing the lift of the wing by a suitable adjustment of the angle of attack and/or of the camber of the profile of the wing itself.

There are many solutions, mainly based, for similarity with the wing of a plane, on the rotation of a flap for increasing the camber of the profile wing and/or on the rotation of the wing itself for changing its angle of attack.

There are many systems for handling and controlling the lifting surfaces, such as shown in U.S. Pat. No. 4,622,913, U.S. Pat. No. 3,110,280, U.S. Pat. No. 3,994,253, U.S. Pat. No. 4,577,579, U.S. Pat. No. 3,645,223, US2003070602, U.S. Pat. No. 6,481,363, U.S. Pat. No. 3,929,084. The known systems comprise mechanical actuation, electric actuation and pneumatic actuation.

Furthermore, many known systems provide closed-loop control systems for the automatic adjustment of the lift related to the instant height of the hull on the water level, in order to maintain a substantially constant height.

However, all the known systems for automatically maintaining a constant height of the hull need both position sensors for detecting the instant height, both actuators for changing the lifting surfaces trim, operated by a control unit or on-board computer properly programmed.

As evident, such systems are very expensive both for production cost both for cost of a correct maintenance, which has to be very frequent having electric components in a corrosive environment.

Furthermore, comprising many electric and electronic components, these systems are subjected to relevant types of failure, and in order to augment the reliability redundancies are required that increase further the production cost.

In addition, such systems require a high waste of energy during their actuation, increasing the costs of use.

A solution is proposed by U.S. Pat. No. 2,709,979A that claims a sea watercraft supported by lifting surfaces and having an automatic system for controlling the depth of immersion of the hull that is completely free of electric and electronic components. Such control system is in fact based on the pressure difference between two chambers divided by a septum, whose translation operates the higher or lower deflection of the above described lifting surfaces. This way, when the hull descends quota too much, the pressure difference between the two chambers changes, carrying in translation the septum and then increasing the lift generated by the lifting surfaces.

However this solution, although very interesting, has some significant drawbacks that make it in fact unable to replace, to date, an electronic control system.

Firstly, the system has a problem of maintenance of the quota, since equilibrium configurations are not provided, but only configurations where the pressure difference brings to the translation of the dividing septum and therefore to the bending of the lifting surface. Such solution therefore brings the watercraft to oscillate continuously about a reference position, without however being able to keep it constant in time.

Secondly, there is a problem of response speed of the system, since the pressure difference between the two chambers is typically not much accentuated carrying the dividing septum to translate in times that could result too long for the guide need of the watercraft during the maneuvering phases.

SUMMARY OF THE INVENTION

It is therefore a feature of the present invention to provide a watercraft structure with lifting surfaces at least partially immersed that allows an automatic control of the lifting surfaces to maintain a substantially constant height of the hull on the level of the water.

It is also a feature of the present invention to provide such a watercraft structure that allows the control of the lifting surfaces by an actuating system that has low production and maintenance costs.

It is also a feature of the present invention to provide such a watercraft structure that allows the control of the lifting surfaces by an actuating system with low or zero energy impact.

It is a further feature of the present invention to provide such a watercraft structure that allows the control of the lifting surfaces by an actuating system with high reliability and long life to use.

It is still a feature of the present invention to provide such a watercraft structure that allows the control of the lifting surfaces in a gradual manner.

It is then a feature of the present invention to provide such a watercraft structure that allows the control of the lifting surfaces with a precision and a response speed adapted to the maneuvers of a modern vessel.

These and other objects are achieved by a watercraft structure comprising:
- a hull;
- a lifting surface connected to the hull and immersed at least partially in water, said lifting surface adapted to generate a lift force suitable for supporting the hull, said lifting surface comprising a movable portion which is adapted to rotate relatively to the watercraft, between a position of higher lift and a position of lower lift;
- an actuating mechanism arranged to actuate the movable portion between the above described positions of higher and lower lift, said actuating mechanism comprising:
  - a containing volume comprising a first chamber at a pressure $P_a$ and a second chamber at a pressure $P_b$ divided by a septum, said septum having a first face having surface $S_a$ and oriented towards the first chamber and a second face having surface $S_b$ and oriented towards the second chamber;
  - a reference channel hydraulically connected to the second chamber, said reference channel being in communication with the external environment by a reference opening that, in use, is constantly below the level of the water and is oriented motion direction;
  - a compensation channel hydraulically connected to the first chamber, said compensation channel being in communication with the external environment by at least one respective compensation opening located at a height higher than reference opening, said or each compensation opening being oriented motion direction;

said actuating mechanism being configured in such a way that:

when $P_a*S_a>P_b*S_b$ there is a relative movement between the septum and the chambers arranged to reduce the volume of the second chamber and for making the rotation of the movable portion towards the position of higher lift;

when $P_a*S_a<P_b*S_b$ there is a relative movement between the septum and the chambers arranged to reduce the volume of the first chamber and to produce the rotation of the movable portion towards the position of lower lift;

when $P_a S_a=P_b*S_b$ there is no relative movement between the septum and the chambers, and the movable portion does not rotate;

whose main feature is that the actuating mechanism comprises an auxiliary reference channel hydraulically connected to the second chamber and communicating with the external environment by an auxiliary reference opening that, in use, is fixedly above the level of the water, in such a way that the pressure $P_b$ in the second chamber both identical $(P_w/P_{atm})/2$, where $P_w$ and $P_{atm}$ are, respectively, the water pressure and the atmospheric pressure at the height of the mechanism of actuation.

The presence of the auxiliary reference channel allows creating in the second chamber a pressure $P_b$ lower than $P_w$. This way, when all the compensation channels are immersed there is $P_a*S_a>P_b*S_b$ and the movable portion increases the lift causing the rise of quota of the hull up to bring above the level of the water at least one compensation channel. When at least the half of the compensation channels have emerged, instead, there is $P_a*S_a<P_b*S_b$ and therefore the movable portion decreases the lift causing the hull to descend.

The solution provided by the present invention, in all the exemplary embodiments described below, provides therefore a system of maintenance of the quota of the watercraft that is completely automatic and very inexpensive, since it is the position of the watercraft itself (and the distribution of the pressures that it follows) to operate the actuating mechanism of the mobile surfaces.

Advantageously, the auxiliary reference opening can be located on the lower part of the lifting surface, where there is depression for Venturi effect.

In particular, when $P_a*S_a>P_b*S_b$ there is rotation of the movable portion because the septum translates towards the second chamber, whereas when $P_a*S_a<P_b*S_b$ there is rotation of the movable portion because the septum translates towards the first chamber.

Advantageously, in the containing volume a resilient element is provided arranged to apply a force on the septum in order to bring the movable portion towards the position of higher lift.

In particular, the compensation channel comprises two compensation openings located at different heights, in such a way that:

when both the compensation openings are above the level of the water, there is $P_a=P_{atm}<P_b=(P_w+P_{atm})/2$, in such a way that the movable portion (125) moves towards the position of lower lift, decreasing the quota of the watercraft structure;

when both the compensation openings are below the level of the water, there is $P_a=P_w>P_b=(P_w+P_{atm})/2$, in such a way that the movable portion moves towards the position of higher lift, increasing the quota of the watercraft structure;

when only one of the compensation openings is below the level of the water, there is $P_a=P_b=(P_w+P_{atm})/2$, in such a way that the movable portion does not move and the watercraft structure maintains its own quota.

This way, there is an automatic adjustment, and without energy waste, of the quota to which maintaining the hull of the watercraft. While in the solution with a single compensation channel it is not possible to settle at the equilibrium position, but only oscillate around it, in this exemplary embodiment you can obtain, at steady-state, a situation of permanent equilibrium.

Alternatively, the compensation channel comprises a number N of compensation openings located at different heights, said compensation openings comprising a number P, lower or equal to N, of compensation openings above the level of the water, in such a way that:

when $P>N/2$ there is $P_a<P_b=(P_w+P_{atm})/2$, in such a way that the movable portion moves towards the position of lower lift, decreasing the quota of the watercraft structure;

when $P<N/2$ there is $P_a>P_b=(P_w+P_{atm})/2$, in such a way that the movable portion moves towards the position of higher lift, increasing the quota of the watercraft structure;

when $P=N/2$ there is $P_a=P_b=(P_w+P_{atm})/2$, in such a way that the movable portion not wheel and the watercraft structure maintains its own quota.

This allows to settle around the equilibrium quota with more gradually with respect to an exemplary embodiment with only two compensation channels.

In particular a confluence chamber is provided located near the compensation openings and arranged to reduce the speed of the incoming water, increasing the pressure. The chamber allows also to keep substantially constant the pressure in the first chamber in a direct proportional way respect to the number of the immersed compensation openings.

In particular, the containing volume is located within the lifting surface and the septum is integral to the movable portion, said movable portion and said septum arranged to rotate integrally to each other in consequence of a pressure difference between the first and the second chamber. This way, there is a high effectiveness in transmitting the motion and not much space is needed.

Alternatively, the containing volume is a cylinder and the septum translates in it. In this case the septum is connected to the movable portion by a transmission, for example crank-connecting rod.

Alternatively, the containing volume is located within the lifting surface and the septum is integral with respect to the hull, and the lifting surface is adapted to rotate with respect to the septum in consequence of a pressure difference between the first and the second chamber. Such solution can be applied to small sized watercrafts, since it allows cause to rotate all the lifting surface.

Advantageously, in the compensation channel and in the reference channel two pistons of insulation are provided arranged to insulate the two chambers by the external environment.

In particular, the first and the second chamber can be filled with oil or other liquid not corrosive.

This way, you avoid to have to build the chambers and the septum in steel material, and you avoid the production of incrustations in the containing volume or the entry of foreign bodies which might clog the mechanism.

Alternatively, each compensation channel, the reference channel and the auxiliary reference channel are provided, at the respective openings in communication with the external environment, of respective barrier pistons arranged to avoid the entry of external water in the mechanism of actuation.

In particular, the barrier pistons are made as plugs and have diameters larger at the end, in order to prevent that they enter in the channels or go out by the actuating mechanism. This way, the inside of the mechanism of actuation is completely insulated, preventing to sea water and to possible foreign bodies to penetrate inside. It is a more expensive solution, and particularly arranged to large size watercrafts, for example longer than ten meters.

BRIEF DESCRIPTION OF THE DRAWINGS

Further characteristic and/or advantages of the present invention are more bright with the following description of some exemplary embodiments, exemplifying but not limitative, with reference to the attached drawings in which.

DESCRIPTION OF A PREFERRED EXEMPLARY EMBODIMENT

Figure 1:
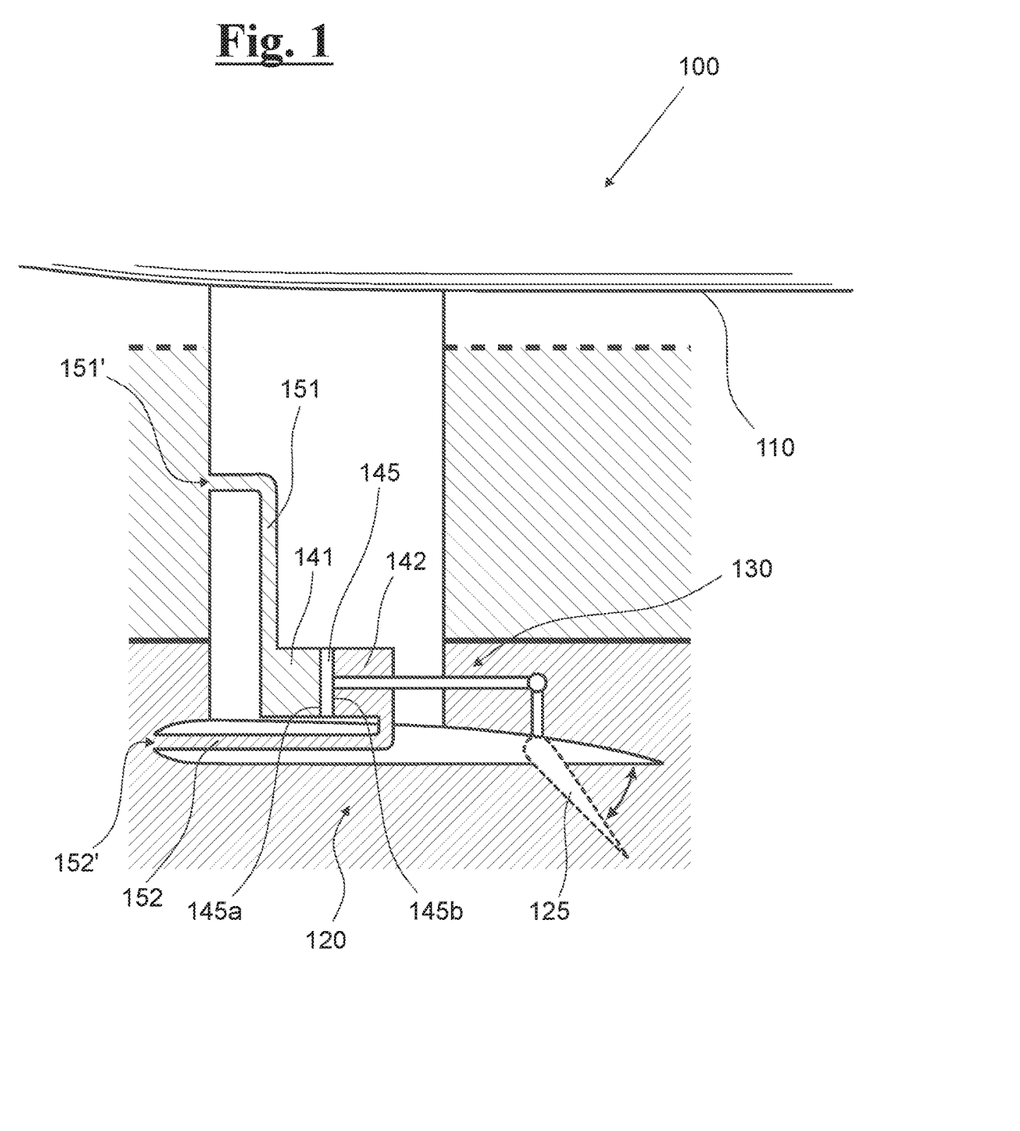
FIG. 1 shows a first exemplary embodiment of the watercraft structure according to the present invention.

With reference to FIG. 1, a watercraft structure 100, according to the present invention, comprises a hull 110 and a lifting surface 120 connected to it. The lifting surface 120 is immersed at least partially in water and is adapted to generate a lift force suitable for supporting the hull 110 itself. The lifting surface 120 also comprises a movable portion 125 arranged to rotate relatively to the watercraft 100, between a position of higher lift and a position of lower lift.

The watercraft structure 100 also comprises an actuating mechanism 130 arranged to actuate the movable portion 125 between the above described positions.

In particular, the actuating mechanism 130 comprises a containing volume comprising a first chamber 141 at a pressure $P_a$ and a second chamber 142 at a pressure $P_b$ divided by a septum 145. Furthermore, the septum 145 has a first face 145a having surface $S_a$ and oriented towards the first chamber 141 and a second face 145b having surface $S_b$ and oriented towards the second chamber 142.

The actuating mechanism 130 also comprises a reference channel 152 hydraulically connected to the second chamber 142 and communicating with the external environment by a reference opening 152' that, in use, is constantly below the level of the water and is oriented in motion direction.

The actuating mechanism 130 comprises then a compensation channel 151 hydraulically connected to the first chamber 141 and communicating with the external environment by a respective compensation opening 151', oriented in motion direction and located at a greater height with respect to the reference opening 152'.

This way, when the watercraft 100 is at a quota for which the level of the water is above the reference opening 152' and below the compensation opening 151', the dynamic pressure $P_b$ of the second chamber 142 is equal to the water pressure $P_w$, whereas the pressure $P_a$ in the first chamber 141 is substantially equivalent at atmospheric pressure $P_{atm}$. In this condition there is $P_a * S_a < P_b * S_b$ and then the septum 145 moves towards the first chamber 141, causing the rotation, by a motion transmission mechanism, of the movable portion 125 towards the position of lower lift.

Decreasing the lift, the watercraft 100 reduces quota until the level of the water is above the compensation opening 151'. In this in the condition, the pressures $P_a$ and $P_b$ are is equal to $P_w$. If the surfaces $S_a$ and $S_b$ were are also equal, you would have $P_a * S_a = P_b * S_b$ and the septum would remain still in balance between two identical and opposite forces. But in this condition the movable portion 125 is still in the position of lower lift, then if the septum 145 would remain in balance, the hull 110 would continue to descend, up to touch the water surface.

For this reason, in an exemplary embodiment of FIG. 1, the surface $S_a$ is slightly higher than the surface $S_b$, owing to the presence of a piston connected to the septum 145 by the part of the face 145b. This way, when you arrive to the condition in that $P_a = P_b$ there is $P_a * S_a > P_b * S_b$ and then the septum 145 is subjected to a resultant force that the pushes towards the second chamber 142, causing the rotation of the movable portion 125 towards the position of higher lift. In consequence, the hull 110 increases its own quota until the level of the water is again below the compensation opening 151'.

The hull arrives then to a vertical and continuous oscillation motion, for which, in a reference system integral to the watercraft and with reference to FIG. 1, the level of the water moves continuously between the broken line and the solid line.

In this way, therefore, the hull of the vessel is kept at a distance with respect to the surface of the water, without need of any kind of control sensors, but simply by means of hydraulic feedback. Compared to the known systems, the solution provided by the present invention is more economical, both in terms of realization and maintenance both in energy terms. Moreover, the system ensures high reliability, as totally free of electrical components and provided with a much lower number of moving parts.

Figure 2:
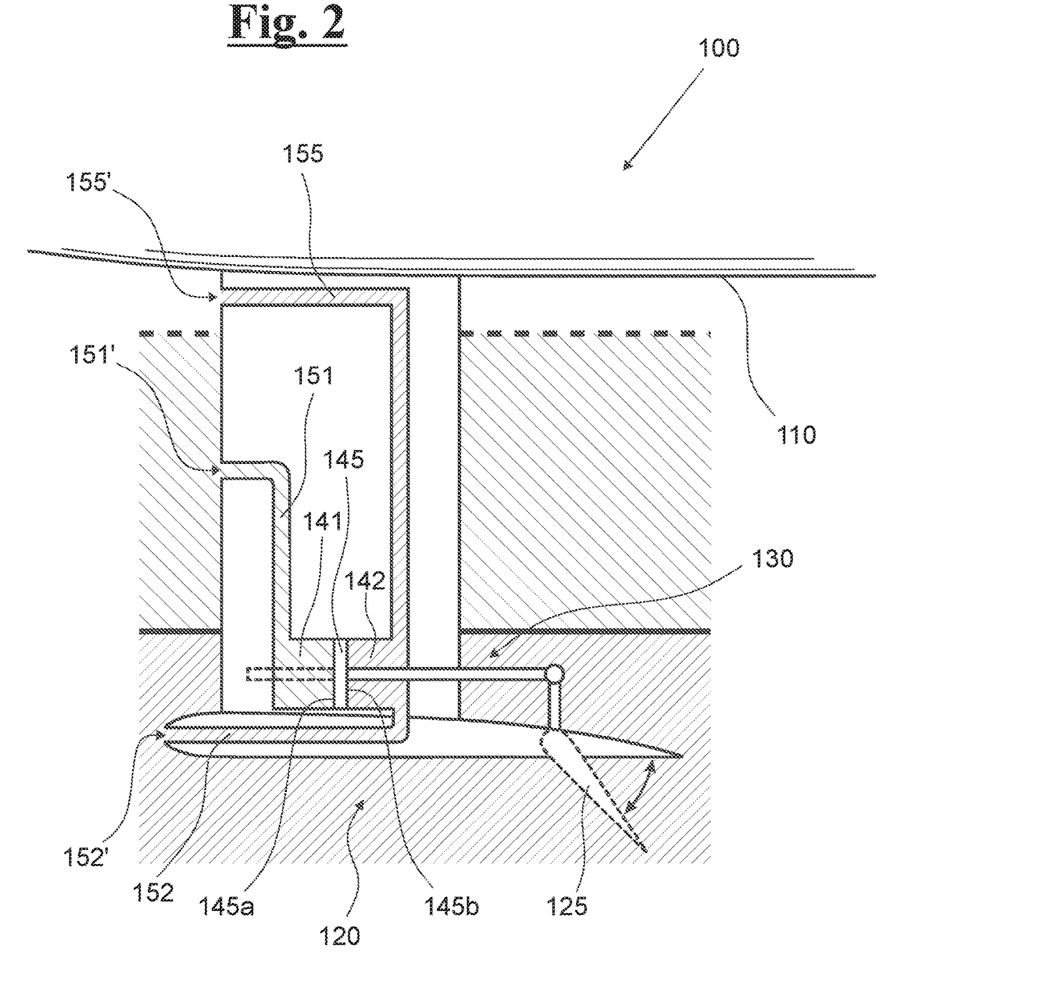
FIG. 2 shows an exemplary embodiment of the watercraft structure where an auxiliary reference channel is provided.

With reference to FIG. 2, an exemplary embodiment of the present invention provides the presence of an auxiliary reference channel 155 hydraulically connected to the second chamber 142 and communicating with the external environment by an auxiliary reference opening 155' that, in use, is constantly above level of the water. In this exemplary embodiment, the pressure $P_b$ in the second chamber 142 is a pressure intermediate between that one of the reference channel 152 and that one of the auxiliary reference channel 155, i.e. intermediate between the water pressure $P_w$ and the atmospheric one $P_{atm}$.

This way, when the level of the water is below the compensation opening 151' there is $P_b = (P_w + P_{atm})/2$ and $P_a=P_{atm}$ and then $P_b>P_a$. Similarly to what happens in the exemplary embodiment of FIG. 1, the movable portion 125 moves to position of lower lift and the hull 110 reduces the quota, until the compensation opening 151' moves below the level of the water. In this situation the water enters compensation channel 151 and the pressure in the first chamber 141 increases up to reaching $P_a=P_w$, whereas in the second chamber 142 remains $P_b=(P_w+P_{atm})/2$. There is then the condition in such a way that $P_b<P_a$ and therefore the movable portion 125 moves again in the position of lower lift causing the hull 110 to increase quota.

With respect to the exemplary embodiment of FIG. 1, it is not, therefore, necessary to have a cross section $S_a$ higher than the surface $S_b$ for bringing the hull 110 to increase again quota. Such system allows also to have a response more ready of the septum 145 since the pressure difference is always equal to $(P_w+P_{atm})/2$.

Figure 3:
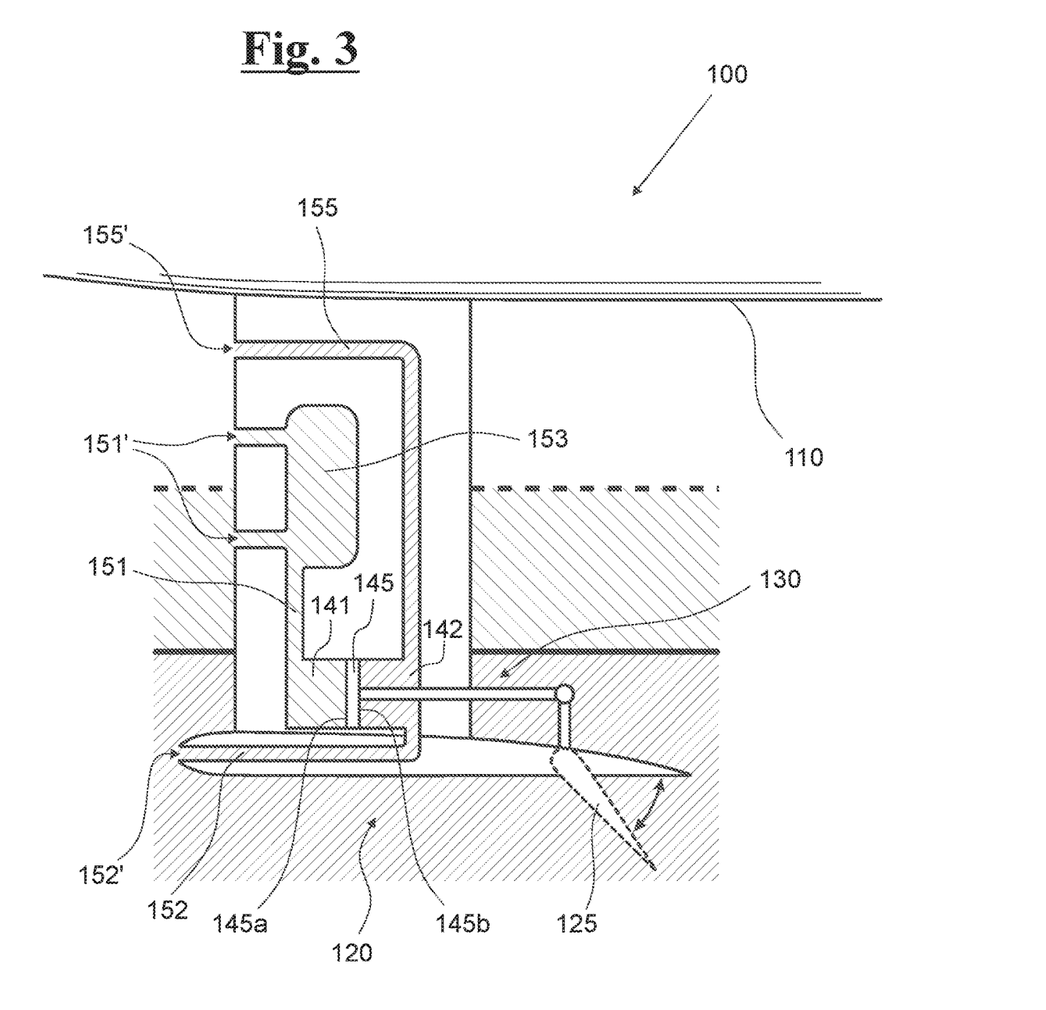
FIG. 3 shows an exemplary embodiment of the watercraft structure wherein two compensation channels and an auxiliary reference channel are provided.

With reference to FIG. 3, an exemplary embodiment of the present invention provides that an auxiliary reference channel 155 is present and that the compensation channel 151 comprises two compensation openings 151' located at different heights.

This way, when both the compensation openings 151' are above the level of the water, there is $P_a=P_{atm}<P_b=(P_w+P_{atm})/2$, in such a way that the movable portion 125 moves towards the position of lower lift, decreasing the quota of the watercraft structure 100.

When instead both the compensation openings 151' are below the level of the water, there is $P_a=P_w>P_b=(P_w+P_{atm})/2$, in such a way that the movable portion 125 moves towards the position of higher lift, increasing the quota of the watercraft structure 100.

When, finally, a single of the compensation openings 151' is below the level of the water, there is $P_a=P_b=(P_w+P_{atm})/2$, in such a way that the movable portion 125 does not rotate and the watercraft structure 100 maintains its own quota.

This exemplary embodiment then further improves the exemplary embodiments of FIGS. 1 and 2, allowing, at steady-state, to maintain the watercraft 100 to a constant quota without vertical oscillations.

Figure 4:
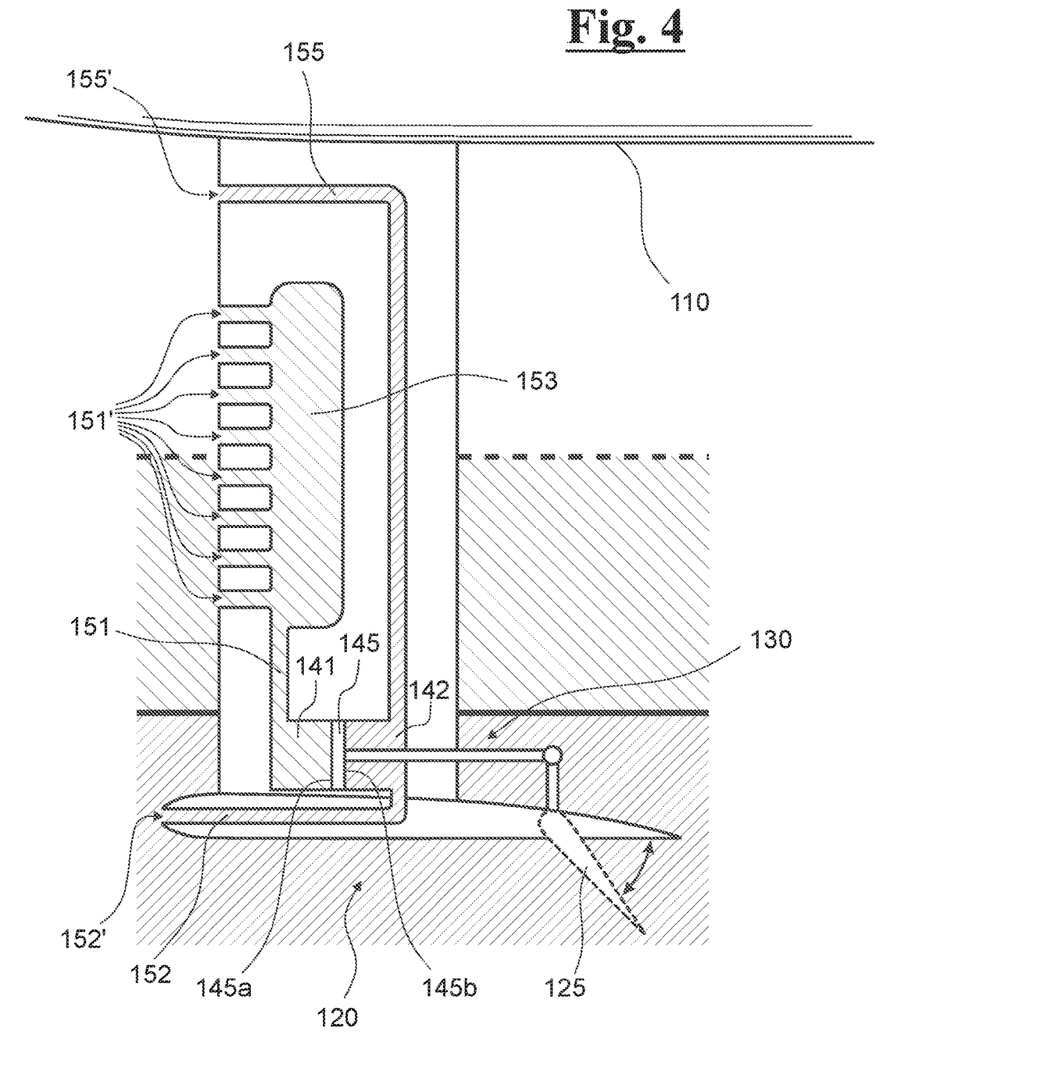
FIG. 4 shows an exemplary embodiment of the watercraft structure where a plurality of compensation channels is provided.

With reference to FIG. 4, a further exemplary embodiment of the present invention provides that an auxiliary reference channel 155 is present and that the compensation channel 151 comprises a number N of compensation openings 151' located at different heights.

This way, considering a number P of compensation openings 151' above the level of the water, you have that:
 when P>N/2 there is $P_a<P_b=(P_w+P_{atm})/2$, in such a way that the movable portion (125) moves towards the position of lower lift, decreasing the quota of the watercraft structure (100);
 when P<N/2 there is $P_a>P_b=(P_w+P_{atm})/2$, in such a way that the movable portion (125) moves towards the position of higher lift, increasing the quota of the watercraft structure (100);
 when P=N/2 there is $P_a=P_b=(P_w+P_{atm})/2$, in such a way that the movable portion 125 does not rotate and the watercraft structure 100 maintains its own quota.

The present exemplary embodiment provides then embodiment variant of the principle described for the exemplary embodiment of FIG. 3. In particular, the fact of having a plurality of compensation openings 151', instead only two, determines a more gradual settling to the equilibrium quota and a greater reliability.

Furthermore, with reference to FIGS. 3 and 4, the compensation channel 151 can comprise a confluence chamber 153, which is located near the compensation openings 151' and arranged to reduce the speed of the incoming water increasing the pressure. Furthermore, the confluence chamber 153 allows keeping the pressure $P_a$ in the first chamber 141 always directly proportional to the number of compensation openings 151' below the level of the water.

Figure 5:
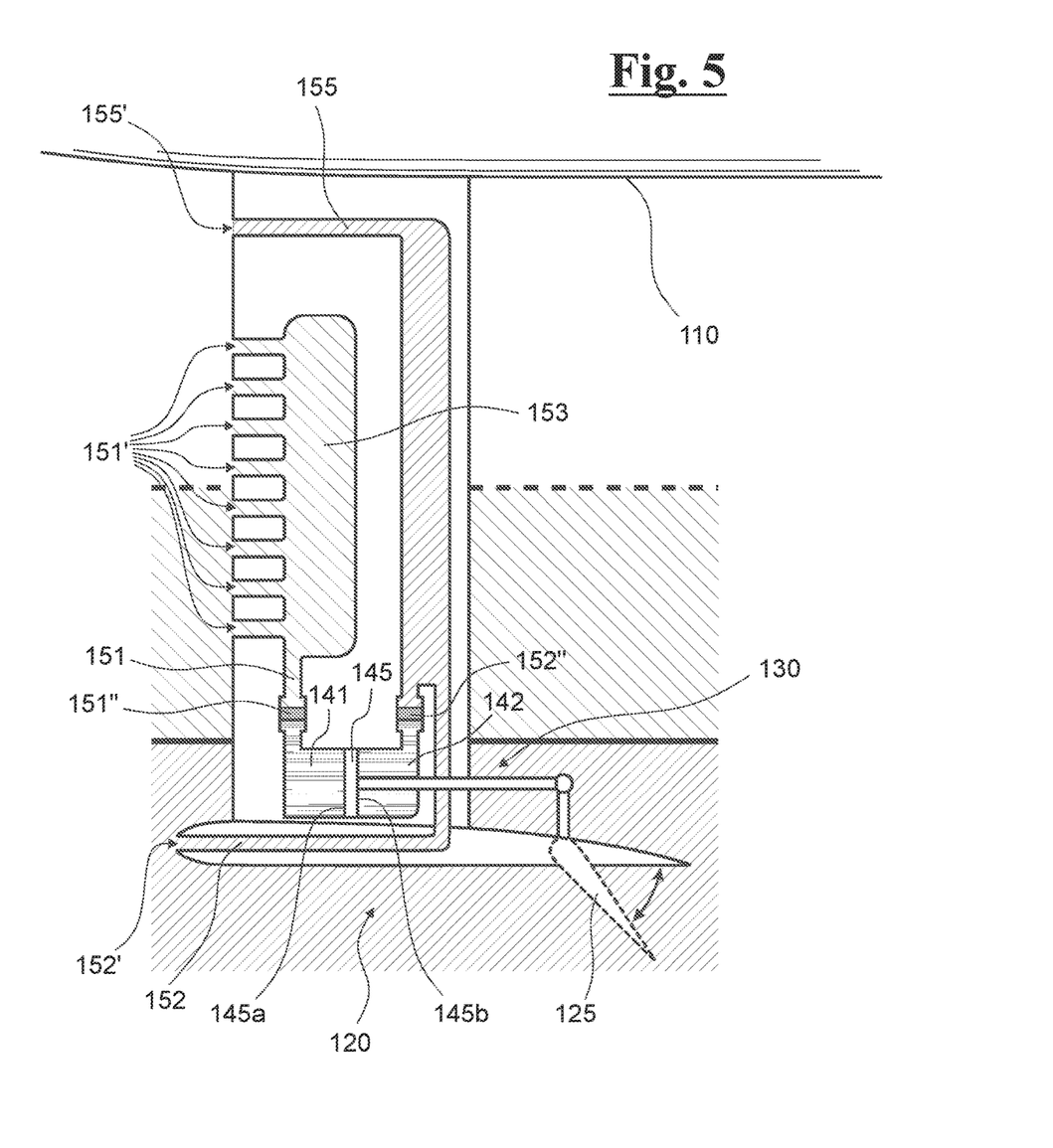
FIG. 5 shows an exemplary embodiment of the watercraft structure wherein pistons for insulating the chambers by the external environment are provided.

With reference to FIG. 5, an exemplary embodiment of the present invention, provides that in the compensation channel 151 and in the reference channel 152 are placed, respectively, two pistons of insulation 151" and 152", in order to insulate the chambers 141 and 142 by the external environment. This way, the chambers 141 and 142 can be filled with oil or other liquid not corrosive, preserving the chambers and the septum by corrosive acting and foreign bodies that could block the mechanism.

Alternatively, barrier pistons can be provided located near the apertures 151',152',155', in order to completely prevent from the inlet of water in the actuating mechanism 130. Such exemplary embodiment is further reliable with respect to the previous, since it prevents from a corrosion and the inlet of objects in all the hydraulic circuit.

In particular, all the barrier pistons can be servo-pistons, actuated by one or more external pumps. In this case, the oil present in the chambers is pumped in or sucked, according to the movement of the septum, by means of such pumps. For example, it can be used a passive pump, operated by the motion of the external water flow.

Figure 6:
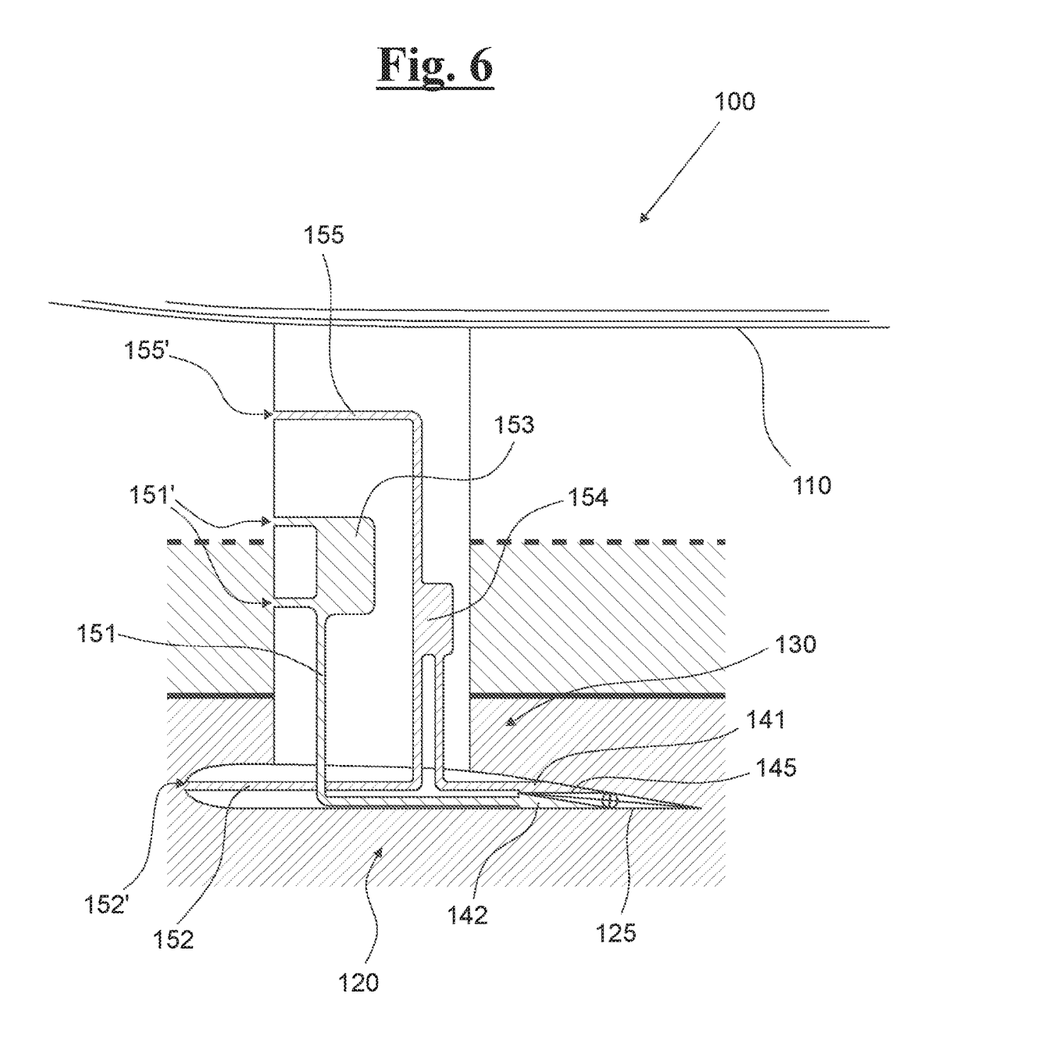
FIG. 6 shows an exemplary embodiment of the watercraft structure where the containing volume is located in the lifting surface and the septum is integral to the movable portion.

With reference to FIG. 6, a possible exemplary embodiment provides that the chambers 141 and 142 are located in the lifting surface 120 and that the septum 145 is integral to the movable portion 125. This way, when the septum rotates due to a disparity between the pressures $P_a$ and $P_b$, in a direct way it rotates also the movable portion 125, not needing the presence of mechanisms for transmitting the motion.

Figure 7:
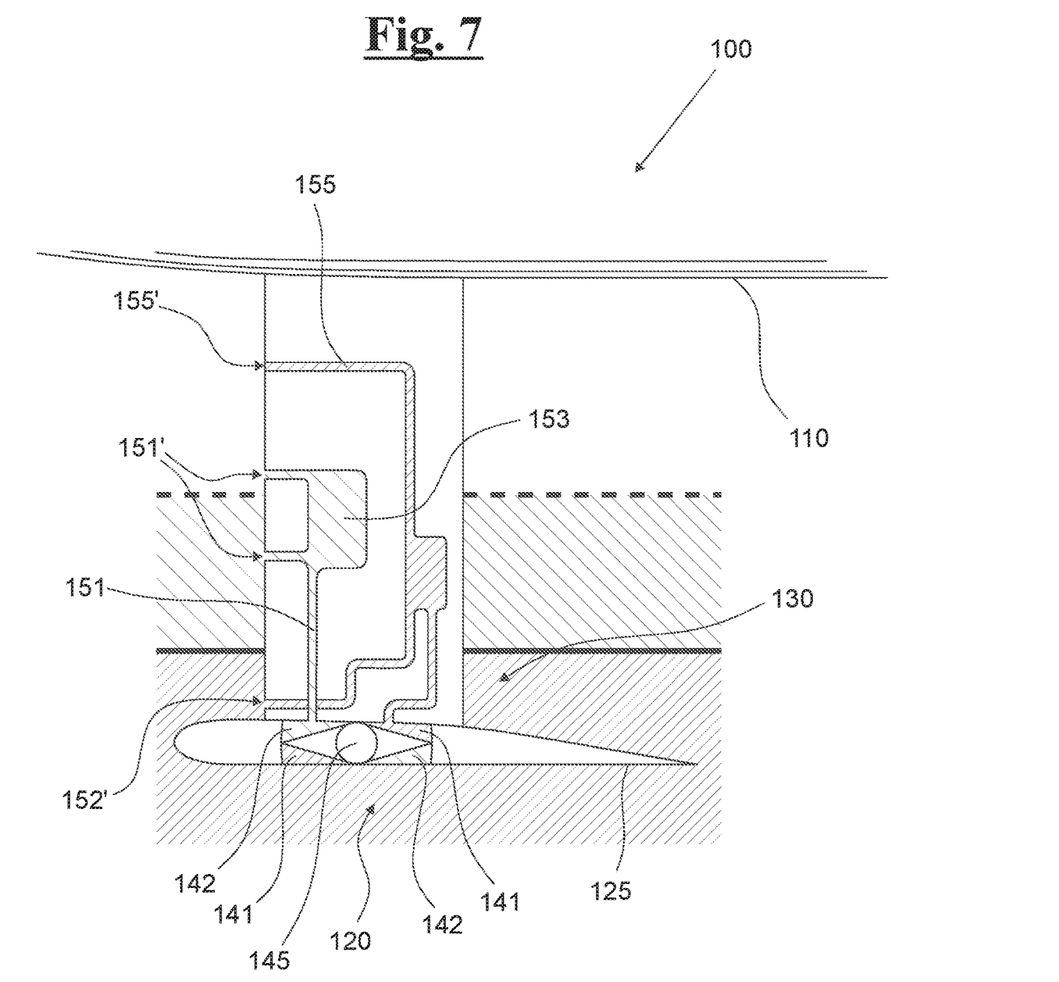
FIG. 7 shows an exemplary embodiment of the watercraft structure where the containing volume is located in the lifting surface and the septum is integral to the hull.

With reference to FIG. 7, a further exemplary embodiment provides that the chambers 141 and 142 are located in the lifting surface 120 and that the septum 145 is integral to the hull 110. In particular, as shown in Fig., the septum 145 has a rhomboidal shape and each one of chambers 141 and 142 is confining with two opposite sides of this septum 145. This way, due to a disparity between the pressures $P_a$ and $P_b$ it rotates all the lifting surface 120 carrying obviously in rotation also the movable portion 125. If, for example, the pressure $P_a$ in the chamber 141 becomes higher than the pressure $P_b$ in the chamber 142, the lifting surface 120 tends to rotate about the septum 145 counterclockwise. Vice-versa, the lifting surface 120 rotates clockwise if $P_b>P_a$.

The latter solution is particularly suitable for small sized watercrafts.

The foregoing description some exemplary specific embodiments will so fully reveal the invention according to the conceptual point of view, so that others, by applying current knowledge, will be able to modify and/or adapt in various applications the specific exemplary embodiments without further research and without parting from the invention, and, accordingly, it is meant that such adaptations and modifications will have to be considered as equivalent to the specific embodiments. The means and the materials to realise the different functions described herein could have a different nature without, for this reason, departing from the field of the invention. it is to be understood that the phraseology or terminology that is employed herein is for the purpose of description and not of limitation.

The invention claimed is:
1. A watercraft structure (100) comprising:
 a hull (110);
 a lifting surface (120) connected to said hull (110) and immersed at least partially in water, said lifting surface

(120) adapted to generate a lift force suitable for supporting said hull (110), said lifting surface (120) comprising a movable portion (125) arranged to rotate relatively to said watercraft (100), between a position of higher lift and a position of lower lift;

an actuating mechanism (130) arranged to actuate said movable portion (125) between said positions of higher and lower lift, said actuating mechanism (130) comprising:

a containing volume comprising a first chamber (141) at a pressure $P_a$ and a second chamber (142) at a pressure $P_b$ divided by a septum (145), said septum (145) having a first face (145a) having surface $S_a$ and oriented towards said first chamber (141) and a second face (145b) having surface $S_b$ and oriented towards said second chamber (142);

a reference channel (152) hydraulically connected to said second chamber (142), said reference channel (152) being in communication with the external environment by a reference opening (152') that, in use, is constantly below the level of the water and is oriented in motion direction;

a compensation channel (151) hydraulically connected to said first chamber (141), said compensation channel (151) being in communication with the external environment by at least one respective compensation opening (151') located at a greater higher with respect to said reference opening (152'), said or each compensation opening (151') being oriented in motion direction;

said actuating mechanism (130) being configured in such a way that:

when $P_a*S_a>P_b*S_b$ there is a relative movement between said septum (145) and said chambers (141,142) arranged to reduce the volume of said second chamber (142) and for making the rotation of said movable portion (125) towards said position of higher lift;

when $P_a*S_a<P_b*S_b$ there is a relative movement between said septum (145) and said chambers (141,142) arranged to reduce the volume of said first chamber (141) and to produce the rotation of said movable portion (125) towards said position of lower lift;

when $P_a*S_a=P_b*S_b$ there is no relative movement between said septum (145) and said chambers (141, 142), and said movable portion (125) does not rotate;

said watercraft structure characterized in that said actuating mechanism (130) comprises an auxiliary reference channel (155) hydraulically connected to said second chamber (142) and communicating with the external environment by an auxiliary reference opening (155') that, in use, is constantly above the level of the water, in such a way that the pressure $P_b$ in said second chamber (142) is equal to $(P_w+P_{atm})/2$, where $P_w$ and $P_{atm}$ are, respectively, the water pressure and the atmospheric pressure at the height of said actuating mechanism (130).

2. The watercraft structure (100), according to claim 1, wherein in said containing volume a resilient element is provided arranged to apply a force on said septum (145) in order to bring said movable portion (125) towards said position of higher lift.

3. The watercraft structure (100), according to claim 1, wherein said compensation channel (151) comprises two compensation openings (151') located at different heights, in such a way that:

when both said compensation openings (151') are above the level of the water, there is $P_a=P_{atm}<P_b=(P_w+P_{atm})/2$, in such a way that said movable portion (125) moves towards said position of lower lift, decreasing the quota of said watercraft structure (100);

when both said compensation openings (151') are below the level of the water, there is $P_a=P_w>P_b=(P_w+P_{atm})/2$, in such a way that said movable portion (125) moves towards said position of higher lift, increasing the quota of said watercraft structure (100);

when only one of said compensation openings (151') is below the level of the water, there is $P_a=P_b=(P_w+P_{atm})/2$, in such a way that said movable portion (125) does not move and said watercraft structure (100) maintains its own quota.

4. The watercraft structure (100), according to claim 1, wherein said compensation channel (151) comprises a number N of compensation openings (151') located at different heights, said compensation openings (151') comprising a number P, lower or equal to N, of compensation openings (151') above the level of the water, in such a way that:

when P>N/2 there is $P_a<P_b=(P_w+P_{atm})/2$, in such a way that said movable portion (125) moves towards said position of lower lift, decreasing the quota of said watercraft structure (100);

when P<N/2 there is $P_a>P_b=(P_w+P_{atm})/2$, in such a way that said movable portion (125) moves towards said position of higher lift, increasing the quota of said watercraft structure (100);

when P=N/2 there is $P_a=P_b=(P_w\pm P_{atm})/2$, in such a way that said movable portion (125) not wheel and said watercraft structure (100) maintains its own quota.

5. The watercraft structure (100), according to claim 1, wherein said containing volume is located within said lifting surface (120) and wherein said septum (145) is integral to said movable portion (125), said movable portion (125) and said septum (145) arranged to rotate integrally to each other in consequence of a pressure difference between said first (141) and said second chamber (142).

6. The watercraft structure (100), according to claim 1, wherein said containing volume is located within said lifting surface (120) and wherein said septum (145) is integral with respect to said hull (110) and said lifting surface (120) is adapted to rotate with respect to said septum (145) in consequence of a pressure difference between said first (141) and said second chamber (142).

7. The watercraft structure (100), according to claim 1, wherein in said compensation channel (151) and in said reference channel (152) two pistons of insulation (151", 152") are provided arranged to insulate said first (141) and said second chamber (142) by the external environment.

8. The watercraft structure (100), according to claim 1, wherein said or each compensation channel (151), said reference channel (152) and said auxiliary reference channel (155) are provided, at the respective openings in communication with the external environment (151',152',155'), of respective barrier pistons arranged to avoid the entry of external water in said actuating mechanism (130).

* * * * *